(12) United States Patent
Bozovic et al.

(10) Patent No.: US 11,519,471 B2
(45) Date of Patent: Dec. 6, 2022

(54) BRAKE DISC AND METHOD FOR PRODUCING A BRAKE DISC

(71) Applicant: Robert Bosch GmbH, Stuttgart (DE)

(72) Inventors: Ilija Bozovic, Karlsruhe (DE); Roland Raab, Wiesloch (DE); Laurent Le Barzic, Strasbourg (FR)

(73) Assignee: Robert Bosch GmbH, Stuttgart (DE)

(*) Notice: Subject to any disclaimer, the term of this patent is extended or adjusted under 35 U.S.C. 154(b) by 69 days.

(21) Appl. No.: 16/631,288

(22) PCT Filed: Aug. 2, 2018

(86) PCT No.: PCT/EP2018/070976
§ 371 (c)(1),
(2) Date: Jan. 15, 2020

(87) PCT Pub. No.: WO2019/025532
PCT Pub. Date: Feb. 7, 2019

(65) Prior Publication Data
US 2020/0208694 A1    Jul. 2, 2020

(30) Foreign Application Priority Data

Aug. 2, 2017 (DE) ...................... 10 2017 213 370.8
Aug. 1, 2018 (DE) ...................... 10 2018 212 864.2

(51) Int. Cl.
*F16D 65/12* (2006.01)
*B60B 27/00* (2006.01)
*F16D 65/02* (2006.01)

(52) U.S. Cl.
CPC ........ *F16D 65/123* (2013.01); *B60B 27/0052* (2013.01); *F16D 2065/1316* (2013.01);
(Continued)

(58) Field of Classification Search
CPC . F16D 65/10; F16D 65/12; F16D 65/123–128
(Continued)

(56) References Cited

U.S. PATENT DOCUMENTS 3,065,661 A * 11/1962 Kolec ................. F16B 19/1054
411/41
3,692,148 A    9/1972 Hauth
(Continued)

FOREIGN PATENT DOCUMENTS

CN      202176604 U    3/2012
CN      204628206 U    9/2015
(Continued)

OTHER PUBLICATIONS

International Search Report corresponding to PCT Application No. PCT/EP2018/070976, dated Nov. 20, 2018 (German and English language document) (6 pages).

*Primary Examiner* — Christopher P Schwartz
(74) *Attorney, Agent, or Firm* — Maginot, Moore & Beck LLP

(57) ABSTRACT

A brake disc includes a friction ring consisting at least partially of a first material and a brake rotor hat consisting at least partially of a second material that is different from the first material. The friction ring includes a flange formed in the axial direction, wherein the flange is connected to the brake rotor hat by means of at least one connection element. An intermediate piece is provided between the surface of the brake rotor hat in contact with the connection element and the connection element. In this way, a stable mechanical connection is created between the flange of the friction ring and the brake rotor hat.

19 Claims, 4 Drawing Sheets

(52) U.S. Cl.
CPC ............... *F16D 2065/1348* (2013.01); *F16D 2065/1392* (2013.01); *F16D 2200/003* (2013.01); *F16D 2200/0013* (2013.01)

(58) Field of Classification Search
USPC .................. 188/17, 18 A, 218 A, 218 XL
See application file for complete search history.

(56) References Cited

U.S. PATENT DOCUMENTS

| | | | |
|---|---|---|---|
| 5,918,707 A | | 7/1999 | Saunders, III |
| 6,116,386 A | * | 9/2000 | Martin .................. F16D 65/123 |
| | | | 188/218 XL |
| 6,336,531 B1 | * | 1/2002 | Chou ...................... F16D 65/12 |
| | | | 188/26 |
| 6,604,613 B2 | * | 8/2003 | Burgoon ................. F16D 65/12 |
| | | | 188/218 XL |
| 8,950,556 B2 | * | 2/2015 | Root ..................... F16D 65/123 |
| | | | 188/218 XL |
| 2008/0164109 A1 | * | 7/2008 | Guether .................. F16D 65/12 |
| | | | 188/218 XL |
| 2012/0085603 A1 | * | 4/2012 | Mayer .................. F16D 65/123 |
| | | | 188/218 XL |
| 2014/0224602 A1 | | 8/2014 | Saame et al. |
| 2016/0160948 A1 | * | 6/2016 | Wagner ................. F16D 65/127 |
| | | | 188/218 XL |
| 2020/0141460 A1 | * | 5/2020 | Bozovic ................ F16D 65/123 |

FOREIGN PATENT DOCUMENTS

| | | |
|---|---|---|
| CN | 205841449 U | 12/2016 |
| DE | 198 15 807 A1 | 10/1998 |
| DE | 100 32 972 A1 | 1/2002 |
| DE | 100 32 972 B4 | 4/2004 |
| DE | 10 2007 018 655 A1 | 10/2008 |
| DE | 10 2008 018 326 A1 | 10/2009 |
| DE | 10 2015 226 450 A1 | 6/2017 |
| EP | 0 564 942 A1 | 10/1993 |
| EP | 0 985 843 A1 | 3/2000 |
| JP | 2006-37993 A | 2/2006 |
| JP | 2007-040505 A | 2/2007 |
| JP | 2007-147061 A | 6/2007 |
| JP | 2008-180369 A | 8/2008 |

\* cited by examiner

BRAKE DISC AND METHOD FOR PRODUCING A BRAKE DISC

This application is a 35 U.S.C. § 371 National Stage Application of PCT/EP2018/070976, filed on Aug. 2, 2018, which claims the benefit of priority to Serial Nos. DE 10 2017 213 370.8, filed on Aug. 2, 2017, and DE 10 2018 212 864.2, filed on Aug. 1, 2018, both filed in Germany, the disclosures of which are incorporated herein by reference in their entirety.

The present disclosure relates to a brake disk and to a method for producing a brake disk having the features described herein.

BACKGROUND

It is the function of brake disks to transmit the braking torque to the axle when the vehicle is being decelerated and to briefly store the kinetic energy which arises during braking in the form of heat and then to release this heat again by conduction, radiation and convection.

In the prior art, brake disks are usually produced in one piece from gray cast iron containing flake graphite.

In the context of lightweight construction, brake disks are being replaced by materials other than gray cast iron, in general lighter materials, especially in the region of the brake pot. A sheet-metal pot may be mentioned here by way of example. The brake pot can likewise be replaced by an aluminum pot. In this regard, DE 100 32 972 B4 may be mentioned by way of example. Here, there is a description of a composite brake disk for a vehicle which has a friction ring made from cast material and which is secured on a brake disk pot consisting of a different material. The friction ring is now connected by connecting elements to the brake pot by means of a joint between the friction ring and the brake disk pot.

SUMMARY

The disclosure starts from a brake disk having
- a friction ring consisting at least partially of a first material, and
- a brake pot consisting at least partially of a second material that is different from the first material, wherein the friction ring has a collar formed in the axial direction, and
- the collar is connected to the brake pot by means of at least one connecting element.

brake disc according to the disclosure has a plastically deformable intermediate piece provided between that surface of the brake pot which rests against the connecting element and the connecting element.

In order to achieve a stable mechanical connection between the collar of the friction ring and the brake pot, a good mechanical connection is necessary between the connecting element and the brake pot and/or collar. Since the surface of the collar is generally of curved configuration, a gap would arise between that surface of the connecting element which is oriented toward the brake pot, which is generally of flat configuration, and the brake pot. This gap could be achieved by means of recesses in the brake pot in the region of the connecting element, for example. However, the material of a brake pot of lightweight construction generally has a thickness of only about 2.5 mm to 2.8 mm. For this reason, a recess in the region of a connecting element would lead to a further reduction in the material, which is already very thin in any case. The disclosed brake disk solves this problem by providing an intermediate piece between that surface of the brake pot which rests against the connecting element and the connecting element. In this case, it is envisaged according to the disclosure that the intermediate piece is not an elastically deformable washer or sleeve but is deformed plastically under the pressure of the connecting element. In contrast to elastic deformation by surface pressure, a very stable mechanical connection is thus formed between the collar of the friction ring and the brake pot. The gap described can thus be closed very effectively.

In an advantageous embodiment of the brake disk, it is envisaged that the connecting element is designed as a rivet, and the intermediate piece is provided between the rivet head and that surface of the brake pot which rests against the rivet head. In particular, the intermediate piece inserted between the rivet head and the brake pot is here composed of a material such that it is deformed by the setting of the rivet. This deformation results in a very stable mechanical connection between the collar of the friction ring and the brake pot.

It is particularly advantageous that the brake pot consists at least partially of light metal, in particular aluminum. It is likewise possible for the brake pot to consist at least partially of metal, in particular sheet metal.

The friction ring can consist of gray cast iron.

In an advantageous embodiment of the brake disk, it is envisaged that the collar is designed so as to be formed integrally on the friction ring.

In particular, the disclosure also relates to a method for producing the brake disk. Here, the method according to the disclosure also starts from:
- a friction ring which consists at least partially of a first material and has a collar formed in the axial direction, and
- a brake pot consisting at least partially of a second material that is different from the first material.

According to the disclosure, the following steps are provided:
- making available the at least one friction ring,
- making available the brake pot,
- connecting the collar to the brake pot by means of a connecting element,
  - wherein, before connection, an intermediate piece is mounted between the connecting element and that surface of the collar which adjoins the connecting element.

Further advantageous embodiments of the disclosure are disclosed herein and the illustrative embodiment.

BRIEF DESCRIPTION OF THE DRAWINGS

Illustrative embodiments of the disclosure are explained below with reference to drawings.

DETAILED DESCRIPTION

Figure 1:
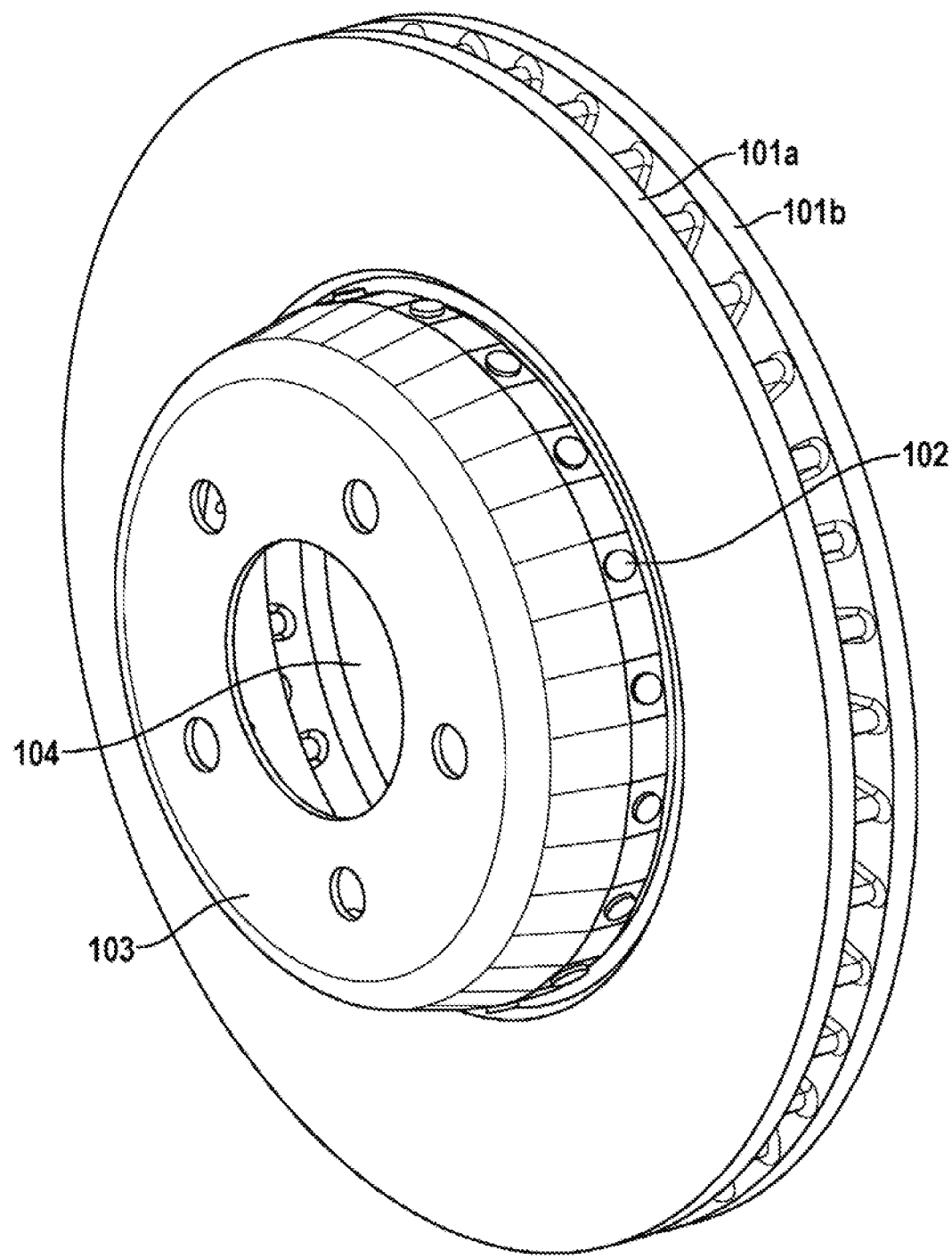
FIG. 1 shows a fully assembled brake disk of lightweight construction according to the disclosure.

The brake disk illustrated in FIG. 1 has two brake rings 101*a* and 101*b* in the form of annular disks, which are connected to spacer elements. The brake disk illustrated is internally ventilated and its brake ring is double-walled. Outer faces of the brake ring form friction surfaces 101a and 101b, in the form of annular disks, of the brake disk. The friction surfaces are the surfaces of the brake disk against which friction brake pads (not illustrated) are pressed during braking in order to brake the brake disk by friction. In this illustrative embodiment, the brake disk consists of gray cast iron or of a steel alloy. In the center, the brake disk has an aperture 104.

Reference sign 103 indicates the brake pot, which is connected to the brake disk by means of the connecting elements 102.

Figure 2:
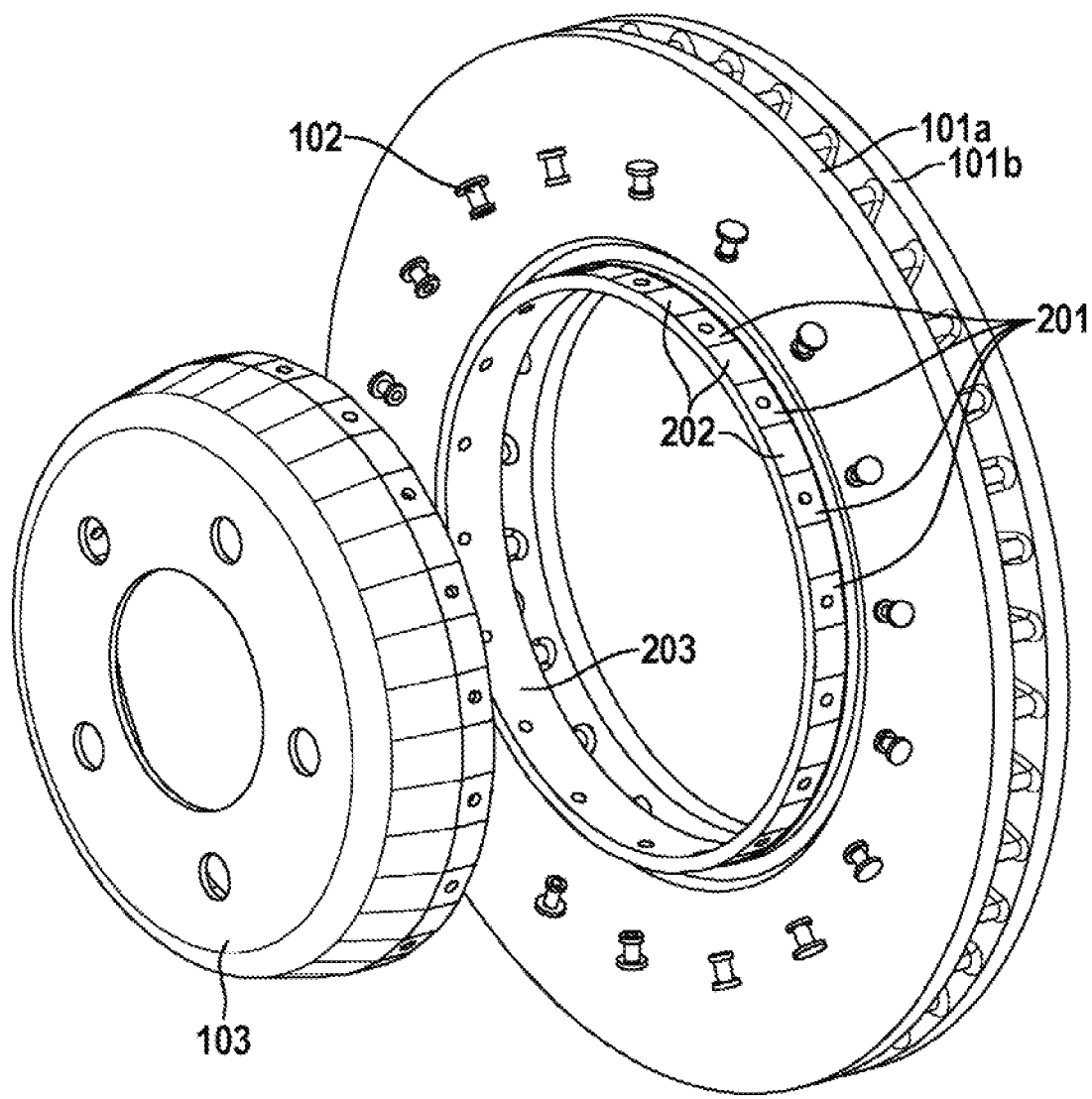
FIG. 2 shows a brake disk of lightweight construction before assembly according to the disclosure.

FIG. 2 shows the brake disk illustrated in FIG. 1 before the connection of the brake pot 103 to the brake disk 101a/b.

A collar 203 having the outer surfaces 201 and 202 is attached in an axially symmetrical manner to the brake disk 101a/b. The connecting elements 102 are illustrated above their associated holes in the collar 201 and 202. For connection between the brake pot 103 and the brake disk 101a/b, holes provided in the outer rim of the brake pot 103 are brought into overlap with the mentioned holes in the collar. The connection means, which are here provided as rivets 201, can then be attached.

Both the collar with the surfaces 201 and 202 and the outer rim of the brake pot 103 have bent, curved and/or circular-arc-shaped surfaces 201 and 202. These bent, curved and/or circular-arc-shaped surfaces 201 and 202 substantially follow the shape predetermined by the round aperture 104.

Figure 3:
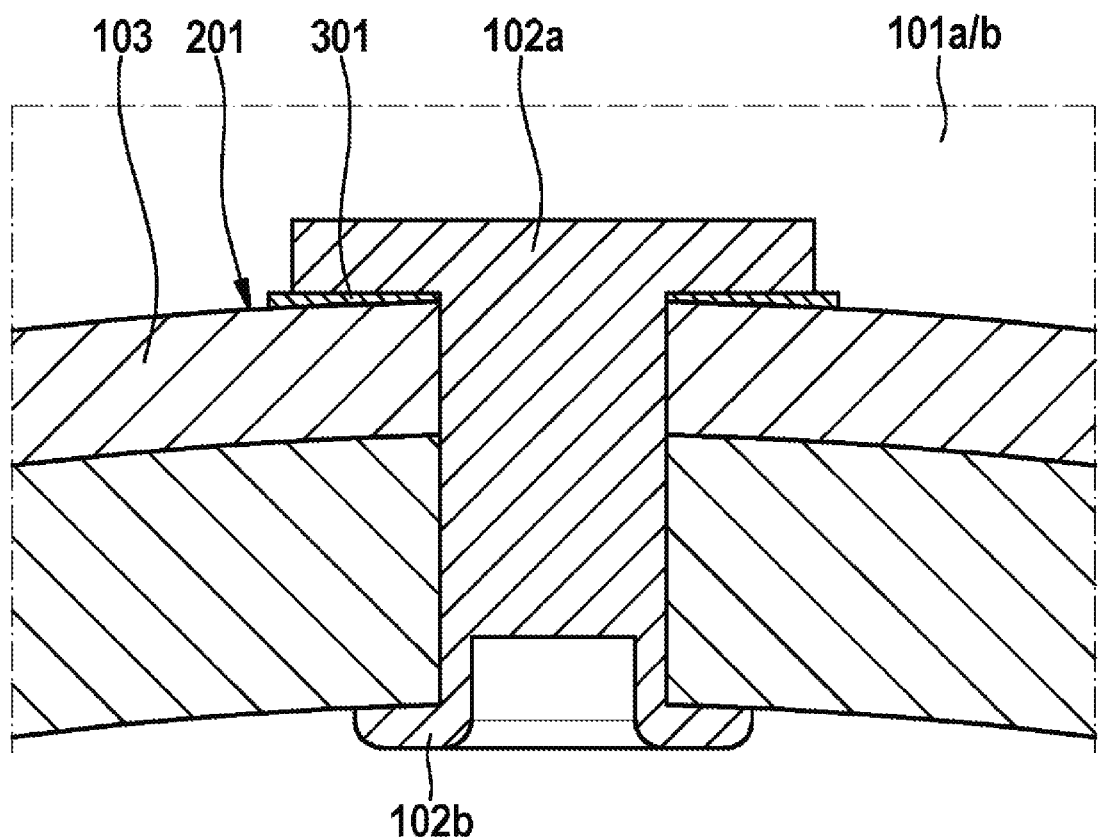
FIG. 3 shows a fully assembled brake disk of lightweight construction according to the disclosure in section.
Figure 4:
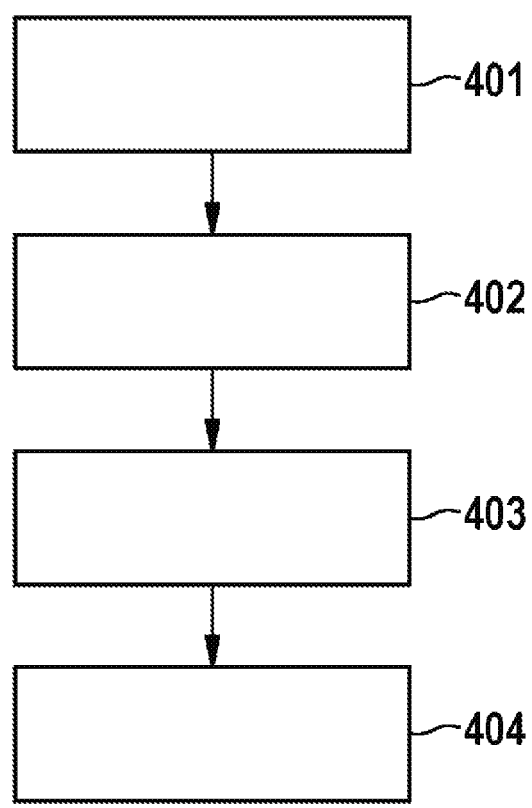
FIG. 4 shows the production method according to the disclosure.

FIG. 3 shows a fully assembled brake disk of lightweight construction according to the disclosure in section (plan view of the friction surface of the friction ring). It can be seen that an intermediate piece 301 is arranged between the rivet 102 and that surface of the rim 201 of the brake pot 103 which is oriented toward the rivet head. In order to achieve a stable mechanical connection between the collar of the friction ring and the brake pot, a good mechanical connection is necessary between the connecting element and the brake pot and/or collar. Since the surface of the collar and of the rim 201 of the brake pot 103 is generally of curved configuration, a gap that increases in the outer regions of the rivet head 102 would arise between that surface of the rivet 102 which is oriented toward the brake pot, which is generally of flat configuration, and the rim 201 of the brake pot. This gap could be achieved by means of recesses in the brake pot in the region of the rivet 102, for example. However, the material of a brake pot of lightweight construction generally has a thickness of only about 2.5 mm to 2.8 mm. For this reason, a recess in the region of a connecting element would lead to a further reduction in the material, which is already very thin in any case. As shown in FIG. 3, the disclosed brake disk solves this problem in that an intermediate piece 301 is provided between that surface of the brake pot which rests against the rivet 102 and the rivet 102. In this case, it is envisaged according to the disclosure that the intermediate piece 301 is not an elastically deformable washer or sleeve but is deformed plastically under the pressure of the connecting element. In contrast to elastic deformation by surface pressure, a very stable mechanical connection is thus formed between the collar of the friction ring and the brake pot. The gap described can thus be closed very effectively. The method for producing the brake disk according to the disclosure will now be explained with reference to FIG. 4.

In step 401, the friction ring 101a/b is made available, and, in step 402, the brake pot is made available.

In step 403, an intermediate piece 301 is then mounted between the connecting element 102 and that surface of the collar 201, 202 which adjoins the connecting element 102. To be more precise, in step 403 the intermediate piece 301 is mounted between the rivet head and that surface 201 of the brake pot 103 which rests against the rivet head.

In step 404, the collar 201, 202 is connected to the brake pot 103 by means of the connecting element 102.

The invention claimed is:

1. A brake disk comprising:
    a friction ring formed at least partially of a first material, the friction ring having a collar formed in an axial direction;
    a brake pot formed at least partially of a second material that is different from the first material, the collar being connected to the brake pot by at least one connecting element; and
    a plastically deformed intermediate piece arranged between a surface of the brake pot and the connecting element.

2. The brake disk as claimed in claim 1, wherein the connecting element is configured as a rivet having a rivet head, and the intermediate piece is provided between the rivet head and the surface of the brake pot.

3. The brake disk as claimed in claim 2, wherein the surface of the brake pot is curved and the rivet head is flat, and the intermediate piece is plastically deformed between the curved surface of the brake pot and the flat rivet head.

4. The brake disk as claimed in claim 1, wherein the second material is a light metal.

5. The brake disk as claimed in claim 4, wherein the second material is aluminum.

6. The brake disk as claimed in claim 1, wherein the second material is a metal.

7. The brake disk as claimed in claim 6, wherein the second material is sheet metal.

8. The brake disk as claimed in claim 1, wherein the first material is gray cast iron.

9. The brake disk as claimed in claim 1, wherein the collar is formed integrally on the friction ring.

10. The brake disk as claimed in claim 1, wherein:
    the collar is connected by the at least one connecting element to an edge of the brake pot that is directed axially towards the friction ring, and
    the connecting element is guided through the surface at a first hole defined in the collar and a second hole defined in the edge.

11. A method for producing a brake disk having a friction ring formed at least partially of a first material and having a collar formed in an axial direction, and a brake pot formed at least partially of a second material that is different from the first material, the method comprising:
    mounting a plastically deformable intermediate piece between a connecting element and a surface of the brake pot that adjoins the connecting element; and
    connecting the collar to the brake pot with the connecting element after mounting the intermediate piece in such a way that the intermediate piece is plastically deformed between the connecting element and the surface of the brake pot.

12. The method as claimed in claim 11, wherein the connecting element is configured as a rivet having a rivet head, and the intermediate piece is arranged between the rivet head and the surface of the brake pot.

13. The method as claimed in claim 12, wherein the surface of the brake pot is curved and the rivet head is flat, and the intermediate piece is plastically deformed between the curved surface of the brake pot and the flat rivet head.

14. The method as claimed in claim 11, wherein the second material is a metal.

15. The method as claimed in claim 14, wherein the second material is sheet metal.

16. The method as claimed in claim 11, wherein the second material is a light metal.

17. The method as claimed in claim 16, wherein the second material is aluminum.

18. The method as claimed in claim 11, wherein the first material is gray cast iron.

19. The method as claimed in claim 11, wherein:
   the collar is connected by the at least one connecting element to an edge of the brake pot that is directed axially towards the friction ring, and
   the connecting element is guided through the surface at a first hole defined in the collar and a second hole defined in the edge.

* * * * *